R. KROEDEL.
FOLDING CAMERA.
APPLICATION FILED DEC. 24, 1917.
1,262,677.
Patented Apr. 16, 1918.
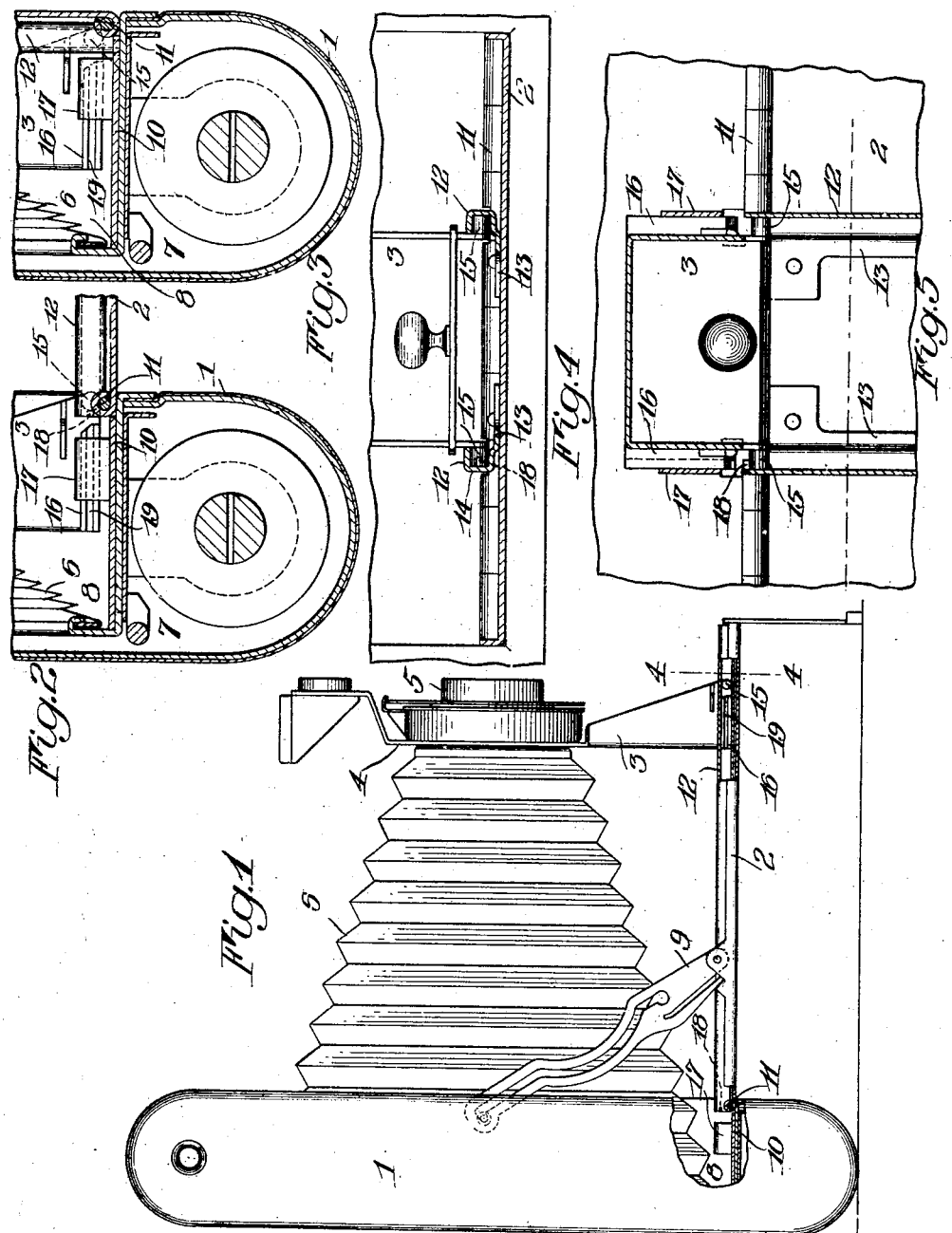
WITNESS
Nelson H. Copp
INVENTOR.
Robert Kroedel
BY
his ATTORNEYS.

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

1,262,677.  Specification of Letters Patent.  Patented Apr. 16, 1918.

Application filed December 24, 1917. Serial No. 208,567.

*To all whom it may concern:*

Be it known that I, ROBERT KROEDEL, of Rochester, in the county of Monroe and State of New York, have invented certain new and useful Improvements in Folding Cameras; and I do hereby declare the following to be a full, clear, and exact description of the same, reference being had to the accompanying drawings, forming a part of this specification, and to the reference-numerals marked thereon.

My present invention relates to photography and more particularly to folding cameras of the type in which a lens carriage travels upon tracks on the combination bed and front closure of the camera and to a folded position upon an alined track within the camera body and the invention has for its object to provide a simple and convenient structure of this nature that will cause the carriage to work smoothly at all times and obviate any difficulty in transferring the carriage from the body track to the bed track as the camera is extended or unfolded for use. To these and other ends the invention resides in certain improvements and combinations of parts all as will be hereinafter more fully described, the novel features being pointed out in the claims at the end of the specification.

In the drawings:

Figure 1 is a side view partly broken away of a folding camera constructed in accordance with and illustrating one embodiment of my invention, the same being in the extended or unfolded position;

Fig. 2 is an enlarged fragmentary sectional view taken through the lower portion of the body and the hinge of the bed with the lens carriage in retracted position ready for the folding of the bed;

Fig. 3 is a view similar to Fig. 2 but showing the bed folded;

Fig. 4 is a fragmentary transverse section through the bed taken substantially on the line 4—4 of Fig. 1, and Fig. 5 is an enlarged fragmentary plan view partly in horizontal section through the carriage and tracks of the hinge connection between the bed and body.

Similar reference numerals throughout the several views indicate the same parts.

The camera illustrated in the present embodiment of the invention is of a familiar type comprising a body 1, a bed 2, a lens carriage 3 supporting a lens board or front 4 and lens tube 5 and a bellows 6 connecting the front and body. The film spool chambers are at the top and bottom of the body (the one at the bottom being indicated at 7 in Figs. 2 and 3) and between them is a bellows chamber 8 into which the bellows 6 is compressed when the camera is folded. The hinged bed 2 when not in the operative position of Fig. 1, acts as a closure for the front of the bellows chamber and when extended is supported from the body by links 9.

The bed 2 is connected to the body, preferably at the forward edge of the floor 10 of the bellows chamber 8 by a hinge 11 and secured to the bed is a track 12 upon which the carriage 3 may slide. The rails of the track, as shown in Fig. 4, are formed by inturned flanges on track plates 13 so that they provide inwardly turned grooves 14. These grooves are engaged by cylindrical trunnions 15 projecting laterally at the front of the carriage 3 and by ribs or lugs 16 in rear of the trunnions. On the floor 10 of the bellows chamber is a short section of track 17 similar to the track 12 and alined with it when the bed 2 is extended into operative position as in Fig. 1.

When it is desired to fold the camera, the bellows 6 is collapsed into the bellows chamber 8 and the carriage 3 and front 4 pressed in after it as usual. This brings the rearward track engaging lugs 16 of the carriage upon the body track section 17 while the forward track engaging trunnions 15 of the carriage remain in engagement with the bed track 12, as shown in Fig. 2. The trunnions 15 being cylindrical, can rotate in the track grooves 14 and they are brought into substantial coincidence with the axis of the hinge 11. Therefore, the carriage is only slightly disturbed as the bed 2 is swung up to the folded position of Fig. 3, there being, with the proportions shown, a slight inward thrust upon the carriage due to the leverage exerted by the bed. The track engaging portions 15 and 16 are relatively fixed yet the carriage is always in engagement with both the track on the bed and the track on the body and when the camera is unfolded again, the position of Fig. 2 is resumed and the carriage is ready to be easily drawn out.

In folding, the position of Fig. 2 is determined by a stop pin 18 on each rail of the track 12 that projects into the groove 14 and halts the trunnion 15 at the proper point just over the hinge 11. The lug 16 is provided with a groove 19 permitting it to pass the stop pin 18.

The above construction is very advantageous because of the fact that the carriage 3 is always in engagement with the bed track 12 and when the camera is unfolded or extended for use, there is no difficulty in transferring the carriage from the body to the bed. In previous devices, where the carriage passed completely off of the bed track and onto the body track, it was difficult to so aline the tracks and to so construct the track engaging portions of the carriage that the latter would fit the bed track firmly and without lost motion and would at the same time pass on to it readily from the body track without catching or jamming.

I claim as my invention:

1. In a folding camera, the combination with a body, a bed hinged thereto and tracks on the bed and body alined with each other when the bed is in operative position, of a lens carriage having two relatively fixed track engaging portions one of which is adapted to turn in the bed track while the other is in coöperation with the body track to permit the bed to be folded against the body.

2. In a folding camera, the combination with a body, a bed hinged thereto and tracks on the bed and body alined with each other when the bed is in operative position, of a lens carriage slidable on the bed having two relatively fixed track engaging portions, one of which is constituted by a pair of trunnions adapted to turn in the bed track while the other is in coöperation with the body track to permit the bed to be folded against the body.

3. In a folding camera, the combination with a body, a bed hinged thereto and tracks on the bed and body alined with each other when the bed is in operative position, of a lens carriage slidable on the bed track having a track engaging portion movable onto the body track and a track engaging portion that remains on the bed track and turns therein as the bed is folded, said last mentioned track engaging portion being substantially coincident with the hinge axis of the bed when the lens carriage is moved to a folded position on the body track.

ROBERT KROEDEL.

Witnesses:
HELEN M. FRASER,
MARGARET DUIGNAN.

Copies of this patent may be obtained for five cents each, by addressing the "Commissioner of Patents, Washington, D. C."